Figure 6:
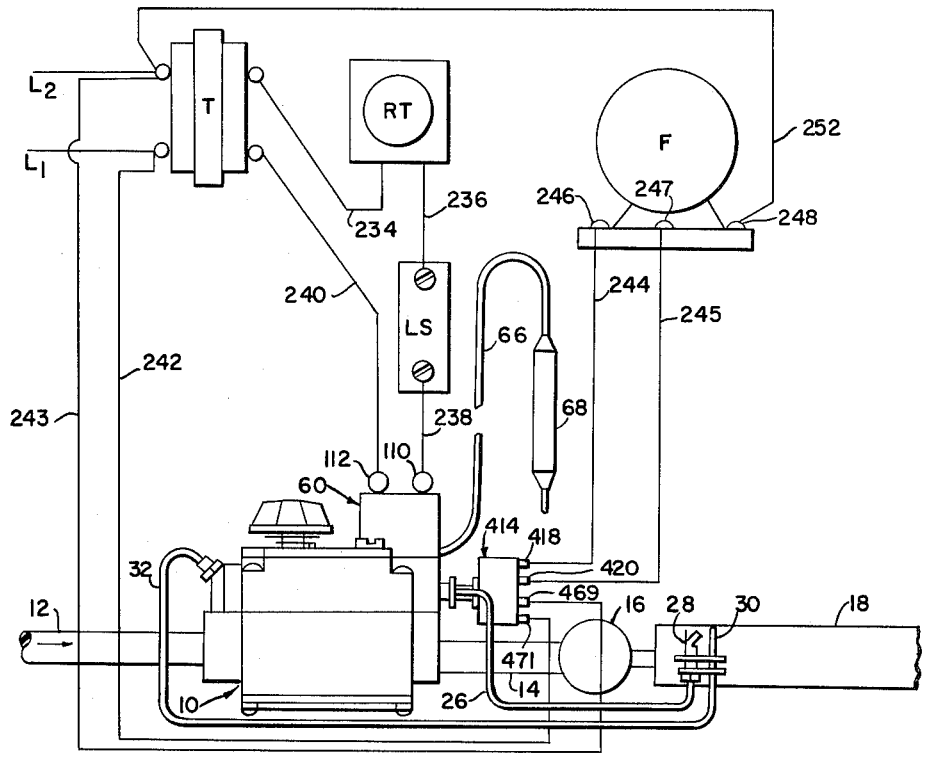

July 12, 1966    M. J. CAPARONE ET AL    3,260,459
FORCED AIR HEATING CONTROL SYSTEMS
Filed Jan. 29, 1963    5 Sheets-Sheet 1
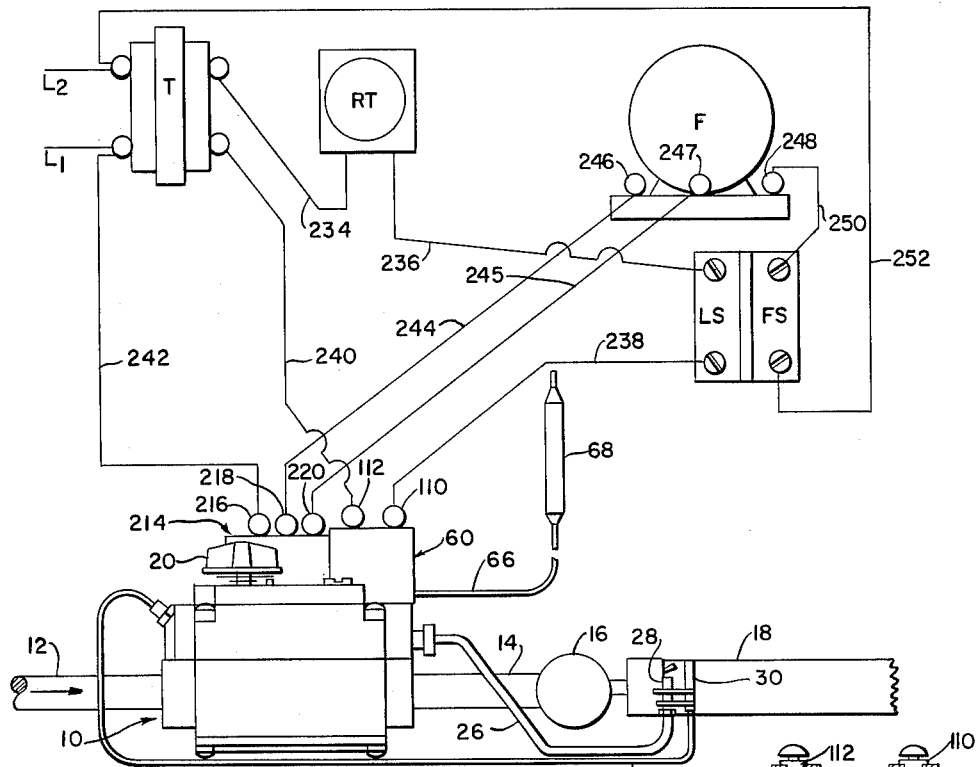
FIG.1.
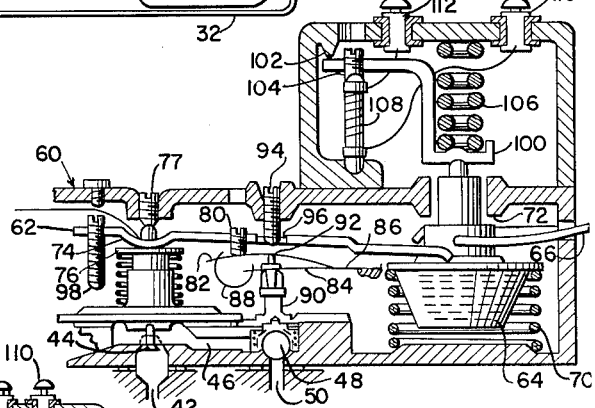
FIG.2.
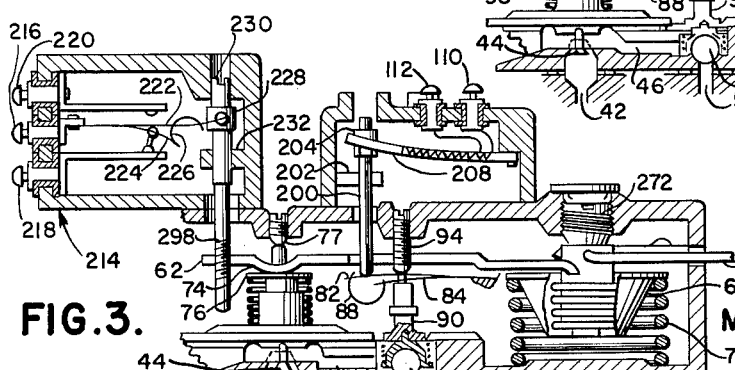
FIG.3.
INVENTORS
Michael J. Caparone &
Marvin M. Graham
BY 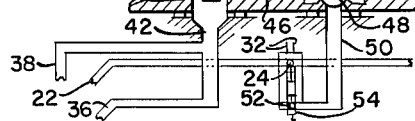
ATTORNEYS

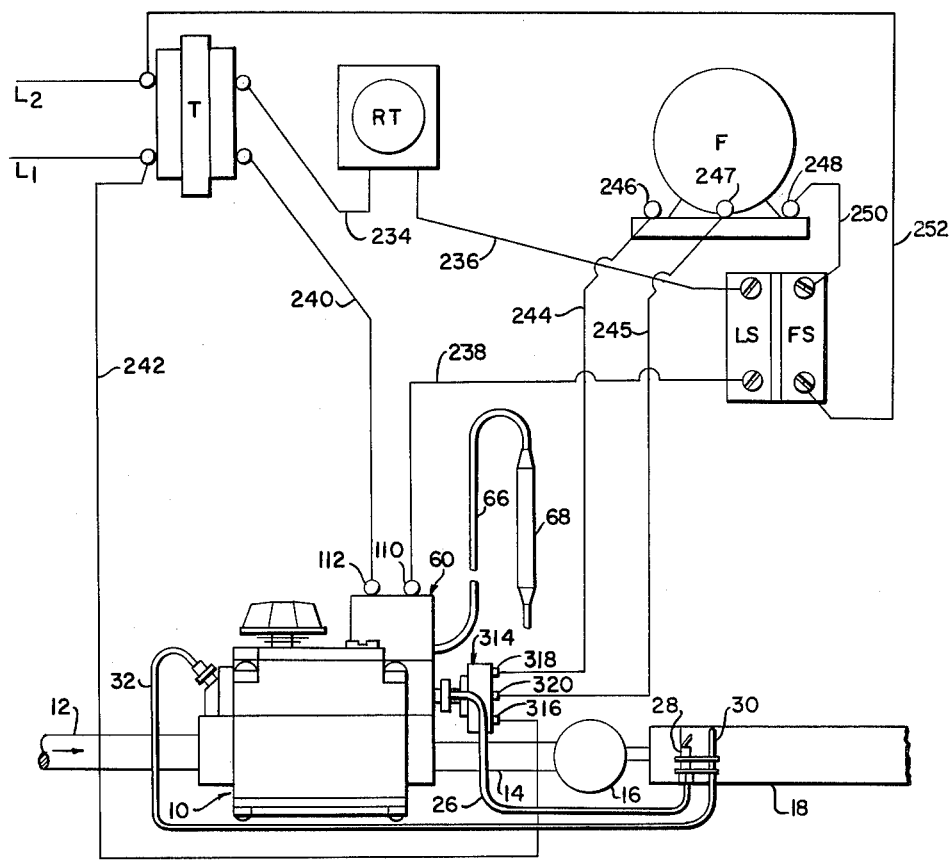

INVENTORS
Michael J. Caparone &
Marvin M. Graham

BY Birch and O'Brien

ATTORNEYS

INVENTORS
Michael J. Caparone &
Marvin M. Graham

BY Birch and O'Brien

ATTORNEYS

INVENTORS
Michael J. Caparone &
Marvin M. Graham

United States Patent Office 3,260,459
Patented July 12, 1966

3,260,459
FORCED AIR HEATING CONTROL SYSTEMS
Michael J. Caparone, Arcadia, and Marvin M. Graham, San Pedro, Calif., assignors to Robertshaw Controls Company, a corporation of Delaware
Filed Jan. 29, 1963, Ser. No. 254,979
12 Claims. (Cl. 236—80)

This invention relates to heating control systems utilized for central heating and unit space heating.

In order to maintain an adequate heat level in an area to be heated by a forced air circulation system, it has been found that it is necessary to control the temperature in the room in response to temperature changes, to vary the heat input to the system in response to varying heat losses and to regulate the speed of air circulation in accordance with varying heat input.

It is, therefore, an object of this invention to utilize a multiple purpose control device for maintaining proper temperature control, input control and circulation control.

This invention has another object in that the input to a gaseous fuel burner of a heating system is varied in response to heat losses.

Another object of this invention is to control the temperature of an area being heated and to regulate the heat input thereto in response to varying heat losses.

Another object of this invention is to maintain precise control of a heated area by on-off temperature control, by regulated heat input and by varied circulation in accordance with regulated heat input.

It is another object of this invention to operate a control lever device by superimposed movements of an electrically operated thermal actuator and a hydraulically operated thermal actuator.

This invention has a further object in that the operative positioning of a control lever by the superimposed movements of electrical and hydraulic thermal actuators for control of fuel flow, also effects the operative position of a selector control for circulation speed.

Another object of this invention is to operate the speed selector of a heating system fan in response to the regulated pressure of the gaseous fuel delivered to the heating system burner.

This invention has another object in that the speed selector and time delay operator for the fan of a forced air heating system is controlled in accordance with the pressure of the gaseous fuel delivered to the heating system burner.

This invention has a further object in that the electrical circuit for the circulating fan of a forced air heating system includes a time delay operated in response to the on-off temperature control of an area being heated.

This invention has still a further object in that a levered housing controls the operation of a bleed line pressure regulator for actuating a main flow valve and controls the speed selector of a circulating fan in accordance with the operation of the bleed line pressure regulator.

This invention is generally characterized in that an electrical switch room thermostat is operative to determine whether the heating unit of a forced air heating system shall be on or off by controlling the action of a valve through an electrical actuator. A separate distinct sensing means, preferably of the thermal hydraulic bulb and bellows type, senses the outside air temperature (or the return air temperature to the heating unit) and regulates the input pressure of a gaseous fuel to the heating unit to compensate for heat losses. In addition, the speed of a circulating fan is varied in accordance with variations of the input pressure.

Figure 7:
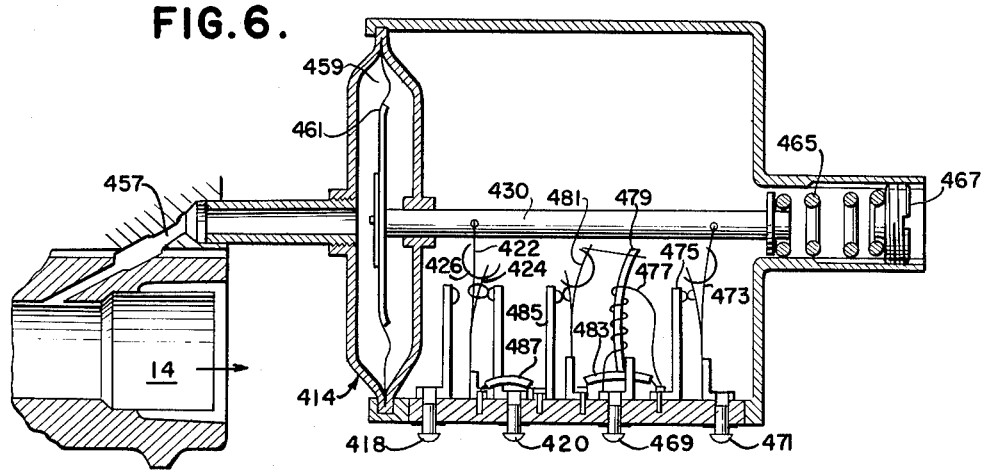
Figure 8:
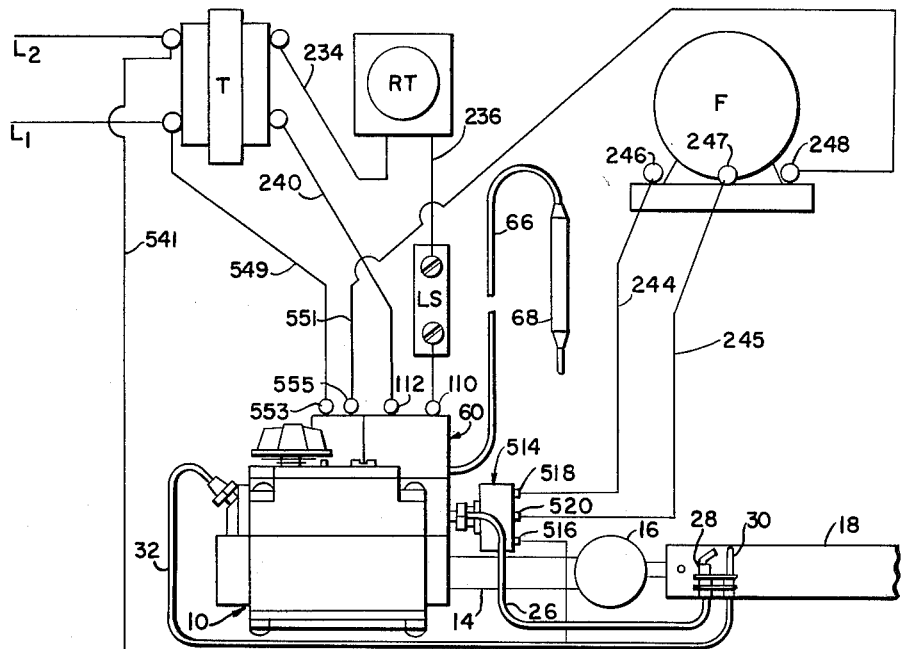
Figure 9:
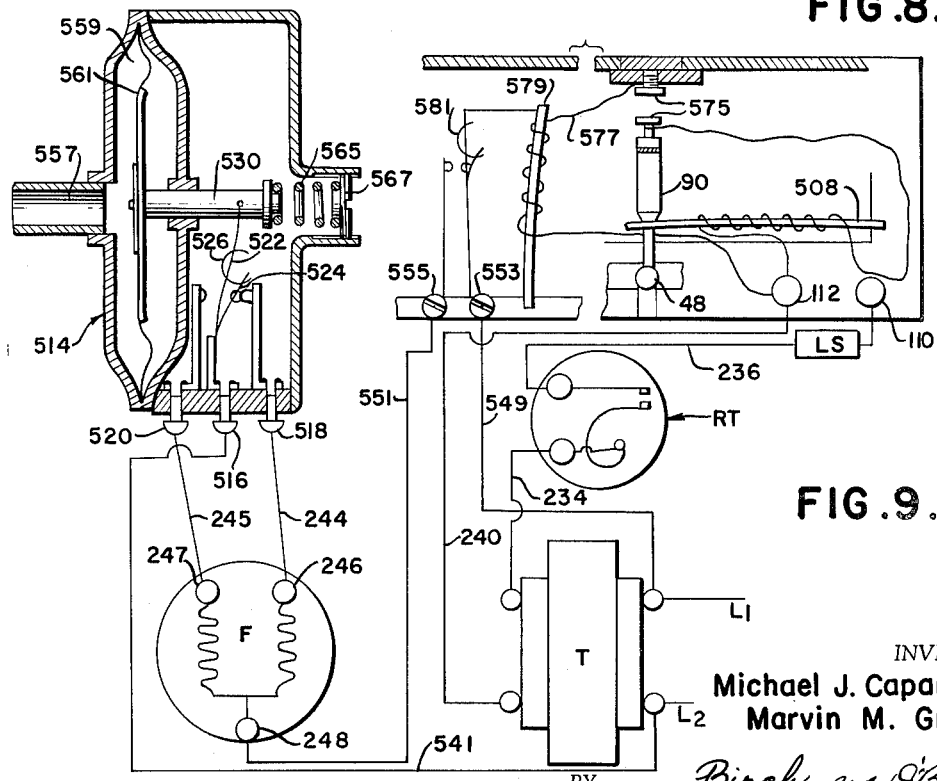
Figure 10:
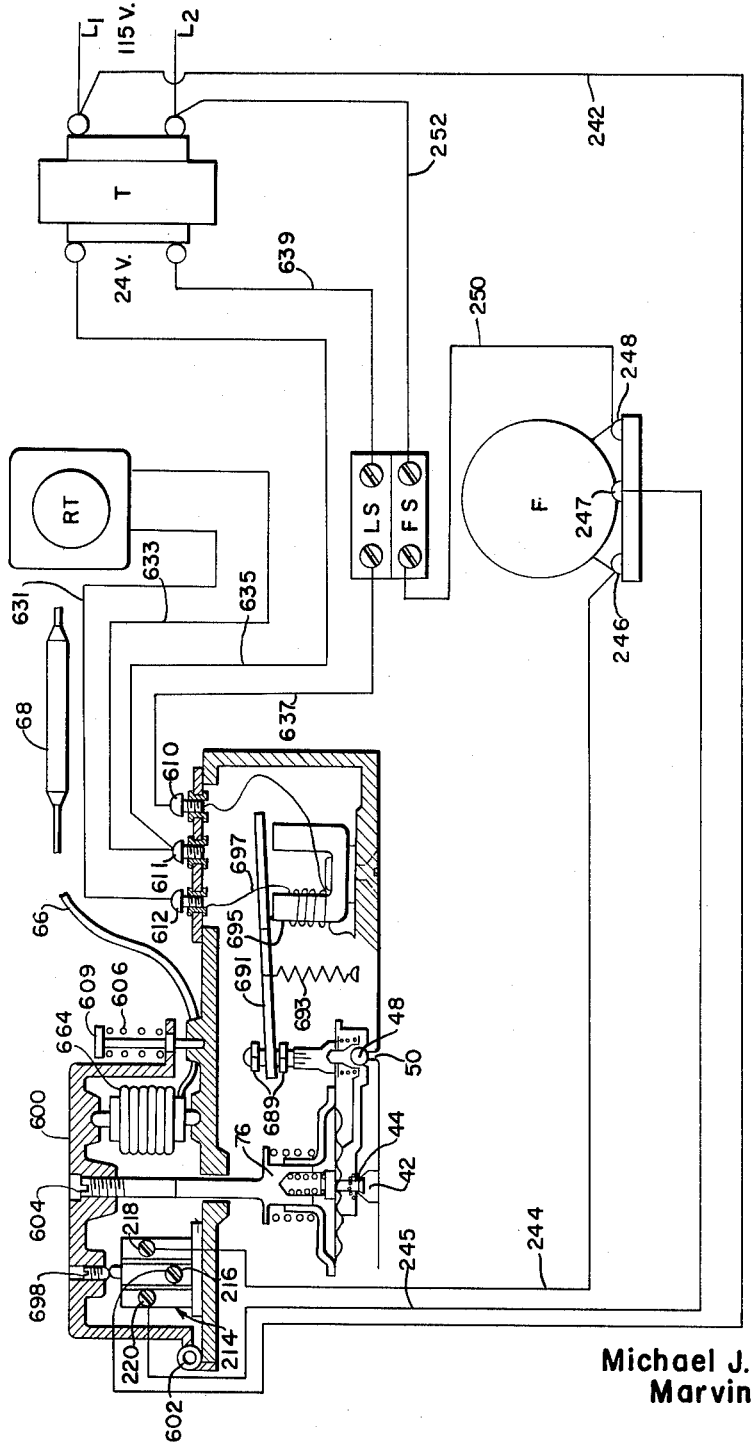

Other objects and advantages will become apparent from the following description of the drawings wherein:

FIGURE 1 is a schematic diagram of a heating control system embodying this invention;
FIGURE 2 is a fragmentary section of a detail of FIGURE 1;
FIGURE 3 is a fragmentary section of a detail of a modification of FIGURE 2;
FIGURE 4 is a schematic diagram of a heating control system of another modification of this invention;
FIGURE 5 is a fragmentary section of a detail of FIGURE 4;
FIGURE 6 is a schematic diagram of a heating control system of another modification of this invention;
FIGURE 7 is a fragmentary section of a detail of FIGURE 6;
FIGURE 8 is a schematic diagram of a heating control system of another modification of this invention;
FIGURE 9 is a fragmentary section of details of FIGURE 8; and
FIGURE 10 is a schematic diagram of a heating control system of another modification of this invention.

As is illustratetd in FIGURE 1, a heating control system embodying this invention includes a gas control device, indicated generally at 10, having an inlet conduit 12 connected to a source of gaseous fuel (not shown) and an outlet conduit 14 connected to a common manifold connection 16 that feeds multiple burners such as the main burner 18 of a heating system which may be a central heating system or a unit heating system. The control device 10 includes a manually rotatable shutoff cock 20 having an "off" position, a "pilot" position and an "on" positon. In the "pilot" position, fuel from the inlet 12 flows through a pilot port in the rotatable plug 20 to a pilot flow passage 22, which is controlled by a safety pilot valve 24, thence externally of the control device 10 through the pilot flow conduit 26 to a pilot burner 28. A thermoelectric generator 30 positioned adjacent the pilot burner 28 is electrically connected by thermocouple leads 32 to an electromagnetic holding device of any suitable type which holds the safety pilot valve 24 open as long as there is a flame at the pilot burner 28 and which may include a manual reset means. Electromagnetic holding devices of this type are well-known in the art and a detailed description thereof is excluded for the sake of brevity.

In its "on" position, the rotatable plug valve 20 continues the flow of pilot fuel and permits a main fuel flow to a main valve chamber 34 from which a bleed line fuel flows through a bleed passage 36. The bleed passage 36 has communication with parallel passages, one such passage 38 leading to an operating pressure chamber 40 and the other passage 42 leading to a pilot regulating valve 44. Bleed line fuel flows from the regulating valve 44 through a passage 46, a thermostatically controlled valve 48, a passage 50 and a safety valve 52 to an outlet passage 54 which communicates with the main flow outlet chamber 56 (FIGURE 5). The safety valve 52 is normally open but is constructed to remain closed during the lighting of the pilot burner 28.

The above construction of the bleed line flow regulates the pressure in the pressure chamber 40 to effect operation of a main flow valve 58 which is of the diaphragm type and which is biased toward its closed position by a helical coil spring 59 whenever the pressures in chamber 34 and chamber 40 are equal. Whenever the thermostatic valve 48 is closed, the bleed line flow to outlet 56 is cut off whereby the underside of the diaphragm valve 58 is subject to inlet pressure and is closed by the coil spring 59. The main diaphragm valve 58 regulates the main fuel flow to the main burner 18 in accordance with the pressure differential on opposite sides of the diaphragm valve 58 and the pilot regulating valve 44, which senses outlet pressure in chamber 56, regulates such pressure differential.

As is illustrated in FIGURES 1 and 2, the control device 10 is provided with an auxiliary component, indicated generally at 60, for operating the bleed valve 48 with a snap action and the pilot regulating valve 44 with a modulating movement. Such valve operations are controlled by a lever and spring mechanism including a lever 62 that has one end engaging a contractible and expansible element 64, such as a bellows, for movement thereby. The bellows 64, a capillary tube 66 and a thermal sensing bulb 68 are interconnected to form temperature responsive means which comprises a closed system filled with a thermally expansible fluid so that a variation of temperature sensed by the bulb 68 produces a corresponding expansion or contraction of bellows 64. The bellows 64 is biased by a coil spring 70 mounted in compression between a flange on the bellows and the interior bottom wall of the auxiliary component casing 60. The coil spring 70 biases the bellows 64 upwardly toward a casing stop 72 to its normal temperature regulating position as will be described hereinafter.

A portion of lever 62 is deformed at 74 to engage the top of a plunger 76, one end of which actuates the pilot regulating valve 44. The other end of plunger 76 extends through the lever 62 and engages an adjusable set screw 77 that is threaded through the top of the component casing 60. Intermediate its ends, the lever 62 carries a set screw 80 which engages the actuating arm 82 of a snap acting mechanism that is conventional in the art. One end of the actuating arm 82 and an adjacent end of an actuated arm 84 are integrated and fixed at 86 to an internal wall of the component casing 60. The arm 84 extends in spaced parallel relation to the arm 82 and has a terminal shoulder which engages one end of a U-shaped rolling spring 88. The opposite end of spring 88 engages a shoulder on the actuating arm 82 to from an overcenter spring. With such an arrangement an applied force on the actuating arm 82 causes movement of the attached end of the rolling spring 88 and as soon as its moving end passes overcenter, the actuated arm 84 is moved with a snap action.

The actuated arm 84 is attached to a valve stem 90 one end of which carries the ball valve 48 while the other end carries a stop button 92 that extends through the actuating arm 82 to engage an adjustable set screw 94. As is illustrated in FIGURE 2, the set screw 94 is adjustably threaded through the top of the component casing 60 and extends through an enlarged, aligned aperture 96 in the lever 62. Adjacent its free end, the lever 62 is provided with a threaded bore receiving an adjustable set screw 98 that defines an adjustable stop for the lever 62.

Adjacent the bellows stop 72, the component casing 60 has an enlarged opening in an internal wall through which the upper end of the bellows 64 protrudes to engage the lower arm of a lever 100. An upper arm of the lever 100 is fulcrummed on a fulcrum point 102 internally formed in the component casing 60 and has a threaded opening receiving an adjustable set screw 104. A coiled loading spring 106 is mounted in compression between an internal wall of the casing 60 and the lower arm of lever 100 which is thus biased to maintain engagement with the upper end of bellows 64. An electric heat motor 108 engages the end of the set screw 104 and upon contraction and expansion causes pivoting of the lever 100 about the fulcrum point 102. The heat motor 108 includes an electric coil, the leads of which are connected to the terminal posts 110 and 112.

In the following description of the various modifications the same reference numerals are being used for identical parts already described and different parts are being identified with reference numerals in the next hundred series for each succeeding modification. For example, in FIGURE 3 which illustrates a modified form of heat motor, the snap acting mechanism is actuated directly by means of a plunger 200 slidably mounted in a fixed bushing 202. By means of a clamping fastener 204 the upper end of plunger 200 is adjustably attached to a heat motor in the form a a bimetal 208 which includes an electric coil having leads connected to the terminal posts 110 and 112. In this instance the set screw 80 of FIGURE 2 is removed to provide an enlarged aperture that slidably receives the plunger 200 and the stop for the top of the bellows 64 comprises an adjustable set screw 272.

FIGURES 1 and 3 include a second auxiliary component enclosed in casing 214 having three terminal posts, a common terminal 216, a low speed fan terminal 218 and a high speed fan terminal 220. The casing 214 houses a single pole, double throw switch that has an actuating arm 222, a contact carrying actuated arm 224 and an overcenter U-shaped rolling spring 226 therebetween. The arm 224 is a conductive strip and is connected to the common terminal post 216; the contact on such arm 224 is moved thereby with a snap action to alternate engagement with the contact extensions from the terminal posts 218 and 220. In order to accomplish the overcenter switch movement, the free end of the actuating arm 222 is attached to an insulator collar 228 fixed on a rod 230 which is slidably disposed in a casing bushing 232. The rod 230 and collar 228 are relatively adjustable to provide an adjustment for the switch snap over point. The lower end of the rod 230 engages an adjustment screw 298 which is threaded through the end portion of lever 62.

The various electrical components and the electrical circuitry therefor will be described in connection with the following description of the sequence of operation of the embodiments shown in FIGURES 1, 2 and 3. Assuming that the heating control system is being utilized in a central forced air heating system having a gas furnace, a room thermostat is suitably positioned on a wall sensing the room temperature, a fan and limit control is located in the furnace casing, and the temperature sensing bulb 68 is located either outside the house or in the return air duct wherein the temperature is indirectly influenced by heat losses and outside temperature. The room thermostat RT is connected across the secondary winding of a transformer T and is in series with the over-temperature limit switch LS and the heat motor terminal posts 110 and 112.

Upon heat demand the room thermostat RT closes its switch and an electric circuit for the heat motor may be traced as follows from the secondary of the transformer T through conductor 234, room thermostat switch RT, conductor 236, limit switch LS, conductor 238, terminal post 110, heat motor 108 (or 208), terminal post 112, and conductor 240 back to the secondary of the transformer T. Energization of the heat motor 108 causes lever 100 to pivot counterclockwise about the fulcrum 102 whereby the bellows 64 is biased upwardly by the coil spring 70 toward the stop 72. As viewed in FIGURE 2, the right end of lever 62 also moves upward whereby the force applied by set screw 80 on the actuating arm 82 is decreased to operate the snap acting mechanism and move the ball valve 48 to an open position. As soon as the bellows 64 is moved to its operative position, the lever 62 is also located in an operative position to act on the plunger 76 and impart a regulatory movement to the pilot regulator valve 44. Thus the ball valve 48 opens the bleed line flow to the main outlet 56 and the main diaphragm valve 58 will regulate a main flow of fuel to the burner 18 in accordance with the predetermined pressure controlled by the pilot regulator valve 44.

In response to temperature variations in the return air duct (or outside air) the sensing bulb 68 causes a corresponding movement of the bellows 64, i.e., contraction from colder air and expansion from warmer air. Thus, warmer air in the return air duct results in expansion of the bellows 64 whereby the lever 62 causes the pilot regulator valve 44 to move upward which restricts the bleed line flow to the ball valve 48 and increases the pressure on the underside of the main diaphragm valve 58. It is now apparent that the regulatory movement of the lever 62 by the bellows 64 causes the pilot regulator valve 44 to regulate the pressure differential on the main diaphragm valve 58. As soon as the heat demand has been satisfied, the room thermostat RT will open the circuit for the heat motor 108 and the above described sequence will be reversed to close the ball valve 48 causing a cut off of the main flow of fuel to the burner 18. With such an arrangement the input to the burner 18 is subject to on-off control by the room thermostat and is proportional to the regulator setting as determined by the temperature sensing bulb 68 whereby the heating control system provides on-off temperature control and demand rate control for the heating apparatus.

In addition to room temperature and demand rate control, the present invention also provides air circulation control by the movement of the lever 62. As is illustrated in FIGURE 3, the rod 230 is biased by the overcenter mechanism to always provide a downward pressure on the rod 230 which thus engages the top of adjusting screw 298. Whenever the room thermostat RT is in an off position or the temperature sensing bulb 68 causes a low pressure input setting, the corresponding position of the lever 62 is such that set screw 298 and rod 230 are located as shown in FIGURE 3 with the common contact on the actuated arm 224 engaging the low speed fan contact on the terminal post 218. An electric circuit for energizing a two speed circulating fan F at a low motor speed may be traced as follows: from line L1, through conductor 242, common terminal 216, switch arm 224, low speed fan terminal 218, conductor 244, low speed motor terminal 246, common motor terminal 248, conductor 250, fan switch FS and conductor 252 back to line L2.

When the room thermostat RT is in an on position and the temperature sensing bulb 68 causes a high pressure input setting, the corresponding position of the lever 62 is such that the set screw 298 and in turn the rod 230 are moved downward as viewed in FIGURE 3 whereby the common contact on the actuated switch arm 224 engages the high speed fan contact on the terminal post 220. The electric circuit for energizing the fan F at a high motor speed includes the terminal post 220, conductor 245, high speed motor terminal 247 and common motor terminal 248.

Precise temperature control of the space being heated, heat loss and demand anticipation and compensation are obtainable with the above arrangement by varying inputs to balance heat loss variations and varying fan speeds providing high or low rates of circulation for corresponding high or low rates of input.

The fan and limit switches FS and LS in the furnace casing or the hot air duct may be of any conventional construction that comprises a thermally responsive actuator. The limit switch LS, which is in series with the room thermostat RT and the heat motor 108 (or 208 in FIGURE 3), is operative upon excessive temperatures to open the circuit which cuts off the main flow of fuel to the burner 18. The fan switch FS, which is in series with the common motor terminal 248 is operative to shut off the motor of fan F on heat satisfaction after shut off of the main burner 18 in the conventional manner.

If it is desired to provide a constant circulation during burner off and low input conditions, the fan switch FS is shunted and the conductor 252 is connected directly to the common motor terminal 248. In this arrangement, the fan is constantly circulating air, at a low speed as described above or at a high speed during periods of high input when the common switch contact arm 224 engages the contact on the high speed terminal post 220.

Referring now to FIGURES 4 and 5, a modification of the present invention eliminates the foregoing single pole, double throw switch 214 of FIGURE 3 and includes a pressure actuated, single pole, double throw switch 314. In this embodiment the pressure switch 314 is connected to an outlet pressure tap 357 leading from the main flow outlet 56 to a pressure sensing chamber 359 on one side of a flexible diaphragm 361. The chamber on the other side of the diaphragm 361 is vented at 363 through a casing wall to the atmosphere. A rod 330 is slidably carried by the casing wall and has one end secured to the diaphragm 361 and an opposite end biased by a coil spring 365 which is mounted in compression between the end of rod 330 and an adjusting screw 367.

The operation of the embodiment shown in FIGURES 4 and 5 is similar to that of FIGURE 3, except that the varying input to the main burner 18 is directly sensed as a pressure variation by the diaphragm 361 control the movement of the common contact arm 324 between the low and high speed fan terminals 318 and 320. The expansion and contraction of the bellows 64 is transmitted through the lever 62 to the pilot regulator valve 44 which regulates the bleed flow line for moving the main diaphragm valve 58. Thus, the input pressure from the main diaphragm valve 58 to the burner 18 is sensed in the pressure chamber 359 and variations in the burner input are reflected by a corresponding movement of the diaphragm 361. In this embodiment, the fan switch FS may also be shunted to provide continuous circulation by the fan F.

Referring now to FIGURES 6 and 7, there is illustrated a further modification of the present invention whereby the duct fan switch is eliminated and a pressure actuated switch 414 combines the functions of a fan delay and a fan speed selector. As is illustrated in FIGURE 6 the pressure actuated switch 414 includes a series of sequentially actuated switches having a low speed fan terminal 418, a high speed fan terminal 420 and a pair of line terminals 469 and 471. Initial movement of the rod 430 when the main flow valve 58 is opened actuates the overcenter mechanism 473 completing a circuit from line conductor 242, through line terminal 471 the conductor arm of overcenter mechanism 473, a stationary terminal 475, heating coil wire 477 and the line terminal 469 to line conductor 243. After a predetermined time delay, a bimetal actuator 479, around which the heating coil 477 is wound, actuates a second overcenter mechanism 481 completing a continuous parallel circuit from the line terminal 471 through the conductor arm of overcenter mechanism 473, the stationary terminal 475, a jumper conductor 483, the conductor arm of overcenter mechanism 481, a stationary terminal 485, a jumper conductor 487 and the common conductor arm 424 to the high speed fan terminal 420.

As shown in FIGURE 6, the fan F will operate at a fast speed until the heating system demand is reduced and the subsequent low input pressure is sensed by the diaphragm 461 to tranfer the common conductor arm 424 to the low speed terminal 418. With the above arrangement, the control system of FIGURES 6 and 7 provides a delay in fan operation after opening of the main flow valve 58 to allow preliminary duct heating before the fan starts whereby circulation of warm air is assured. In addition, a fan delay period occurs on turn down due to time lag for cooling of the bimetal actuator 479 before the fan shuts down whereby circulation continues for such delay time after the main flow valve is closed to permit dissipation of the warm air in the duct work.

Referring now to FIGURES 8 and 9, there is shown another embodiment of the present invention in which the bellows movement and the heat motor movement are transmitted by separate levers. In this instance, the heat motor includes a bimetal actuator 508 encircled by an electric heating coil the leads of which are connected to the terminal posts 110 and 112. One end of the bimetal 508 is operatively connected to the valve stem 90 which carries the ball valve 48 that is moved upward thereby when the switch of the room thermostat RT is closed. When the ball valve 48 is in an open position, the valve stem 90 closes contacts 575 to complete a parallel circuit from the terminals 110 and 112 for energizing the heating coil 577 for the fan delay bimetal actuator 579.

After a predetermined time delay the bimetal actuator 579 causes actuation of the overcenter mechanism 581 completing a circuit traced from the fan motor common terminal 248 through conductor 551, terminal 555, conductor arms of overcenter mechanism 581, terminal 553 and conductor 549 to line L1. The fan speed selector 514 senses the main flow outlet pressure at the pressure tap 557 whereby the pressure in chamber 559 moves the diaphragm 561 and rod 530 against the bias of coil spring 565, which bias is adjustably set by the adjusting screw 567 to a predetermined switch overpoint. The rod 530 transfers the overcenter mechanism 522, 524 and 526 between the low and high speed fan terminal posts 518 and 520 as described in the previous modifications. Thus, a selector circuit may be traced from line L2, through conductor 541, common terminal post 516, conductor arm 524, extension of low speed terminal post 518, conductor 244, low speed motor terminal 246 and the low speed motor resistance to the common motor terminal 248; a similar circuit for high speed fan operation may be traced from the high speed fan terminal 520, through conductor 245, high speed motor terminal 247 and the high speed motor resistance to the common motor terminal.

A conventional type of room thermostat RT which may be utilized in any of the modifications of the present invention is shown in FIGURE 9 as including a pair of switch contacts. One of the switch contacts is mounted on the end of a spiral type bimetal element that winds and unwinds in response to ambient temperature variations in the area being heated.

A further modification of the present invention is illustrated in FIGURE 10 wherein a twenty-four volt electromagnetic operator actuates the ball valve 48 and a separate levered housing operates the pilot regulator valve 44 and the fan speed selector switch 214. In this instance, a generaly U-shaped levered housing 600 has one end pivoted at 602 to an exterior wall of a casing which houses the main flow and bleed line components as described previously. The top of levered housing 600 carries the adjustable set screw 698 which actuates the overcenter mechanism of the fan speed selector 214. An adjusting screw 604 is threaded through the housing 600 and engages the top of regulator plunger 76 whereby pivotal movement of the housing is transmitted to the pilot regulator valve 44. The levered housing 600 is biased toward the casing wall by a coil spring 606 mounted in compression between a flange of the housing and the top of an adjusting screw 609 that extends through the flange and is threaded into casing wall. Movement is imparted to the levered housing 600 by a bellows 664 enclosed therein with one end engaging the casing wall and an opposite end engaging the interior top surface of the housing. The bellows expands and contracts in response to temperature variations sensed by the bulb 68 as mentioned previously.

Snap action movement is imparted to the ball valve 48 by means of a lost motion connection between the valve stem 90 and the electromagnetic actuator. As is illustrated in FIGURE 10, the top of valve stem 90 has a pair of adjustably spaced nuts 689 which are alternately engaged for movement by the bifurcated end of a keep lever 691. Adjacent its bifurcated end, the lever 691 is biased by a tension spring 693 so that its opposite end is normally biased away from the pole faces of a generally U-shaped electromagnet 695 that is fixed in the casing.

During operation of the heating control system of FIGURE 10, the closure of the switch of the room thermostat RT completes an electric circuit for the electromagnet 695 as follows: from the secondary of the transformer T through the conductor 635, the terminal 611, the conductor 633, the room thermostat RT, the conductor 631, the terminal 612, the electromagnet coil 697, the terminal 610, the conductor 637, the limit switch LS and the conductor 639 back to the secondary of the transformer T. Energization of the electromagnet 695 attracts the lever 691 which is fulcrummed on one pole face thereof, and which opens the ball valve 48 that opens the bleed line as described previously to open the main diaphragm valve 58. After opening of the ball valve 48, the pilot regulator valve 44 provided with a regulator movement by the levered housing 600 being moved in response to movement of the bellows 664. At the same time the fan speed selector switch 214 is actuated to the high or low speed terminals 218 or 220 by the movement of the levered housing 600 in accordance with a high or low input demand as sensed by the remote thermal bulb 68.

The electromagnet actuator of FIGURE 10 may be utilized for direct line voltage by elimination of the transformer and by providing suitable wiring and actuator combinations.

Inasmuch as many changes could be made in the above constructions and many more widely different embodiments of the present invention could be made without departing from the scope thereof, it is intended that all matter contained in the foregoing description or shown in the accompanying drawings shall be interpreted as illustrative and not in a limiting sense.

What is claimed is:

1. In a heating control system, the combination comprising a burner for supplying heated air to an area, a differential pressure operated diaphragm valve for supplying fuel at a regulated pressure to said burner, a bleed flow of fuel for maintaining an operating pressure on the one side of said diaphragm valve, a pilot pressure regulator for regulating said bleed flow, an on-off valve movable between on and off positions for controlling said bleed flow, thermostatic means operatively connected to said on-off valve for actuating the same in response to temperature variations in the area, thermally responsive means remotely disposed from the area for modulating said pressure regulator in response to temperature differentials, fan means for circulating the heated air, and selector means controlling the rate of circulation of said fan means in accordance with the operation of said diaphragm valve.

2. The combination as recited in claim 1, wherein said thermostatic means includes an electrically heated bimetal directly connected to said one-off valve for actuation thereof.

3. The combination as recited in claim 1, wherein said thermostatic means includes an electrically heated bimetal, a plunger element connected to said bimetal and an overcenter mechanism operatively disposed between said plunger element and said on-off valve.

4. The combination as recited in claim 1, wherein said thermostatic means includes lever means operative to actuate said on-off valve, and electric circuit means to actuate said lever means.

5. The combination as recited in claim 4, wherein said electric circuit means comprises a heat motor energizable to operate said lever means between on and off positions, said lever means having an extension operatively connected to said pressure regulator and said thermally responsive means includes a bellows member connected to said lever means whereby said pressure regulator is modulated in accordance with bellows movement.

6. In a heating control system, the combination comprising burner means for heating an area, diaphragm valve means for supplying fuel to said burner means at a regulated pressure, a bleed flow of fuel for maintaining an operating pressure on said diaphragm valve means, an on-off valve movable between on and off positions to control said bleed flow, a regulating valve for regulating the bleed flow to modulate said diaphragm valve means, thermostatic means responsive to temperature variations in the area for actuating said on-off valve, thermally responsive means responsive to temperature variations remote from the area for imparting a regulatory movement to said regulating valve, a two speed fan for circulating air to and from the area, and speed selector switch means operative to actuate said fan at one of two speeds.

7. The combination as recited in claim 6, wherein said speed selector switch means is operatively connected to said thermally responsive means for actuation in accordance with high or low demand thereby.

8. The combination as recited in claim 7, wherein said thermally responsive means includes a levered housing and a bellows for moving said switch means and said regulator valve.

9. The combination as recited in claim 8, wherein said thermostatic means includes an electromagnetic actuator lever connected to said on-off valve.

10. The combination as recited in claim 6, wherein said speed selector switch comprises a pressure responsive actuator operatively connected to said diaphragm valve means for response in accordance with high and low demand positions thereof.

11. The combination as recited in claim 6, wherein said speed selector switch includes a time delay for delaying energization and deenergization of said fan.

12. The combination as recited in claim 6, wherein said thermostatic means includes a time delay mechanism and said fan is electrically connected to said time delay mechanism.

References Cited by the Examiner
UNITED STATES PATENTS

| | | | |
|---|---|---|---|
| 1,919,743 | 7/1933 | Peters | 236—10 |
| 2,209,610 | 7/1940 | Persons | 236—10 |
| 2,212,285 | 8/1940 | Ayers | 236—92 |
| 2,262,823 | 11/1941 | Stearns. | |
| 2,402,177 | 6/1946 | Miller | 236—11 X |
| 2,461,615 | 2/1949 | Taylor. | |
| 2,467,425 | 4/1949 | Cobb. | |
| 2,501,627 | 3/1950 | Findley. | |
| 2,502,345 | 3/1950 | Ryder | 236—10 |
| 2,507,119 | 5/1950 | Randall et al. | 236—68 |
| 2,526,972 | 10/1950 | Ray | 236—80 X |
| 2,876,951 | 3/1959 | Matthews | 236—80 X |
| 2,898,928 | 8/1959 | Kehoe | 236—80 X |
| 3,181,789 | 5/1965 | Hill | 236—10 |

ALDEN D. STEWART, *Primary Examiner.*